(12) United States Patent
Lee et al.

(10) Patent No.: US 9,157,676 B2
(45) Date of Patent: Oct. 13, 2015

(54) REFRIGERATOR

(71) Applicant: SAMSUNG ELECTRONICS CO., LTD., Suwon-si, Gyeonggi-do (KR)

(72) Inventors: Jee Hoon Lee, Goyang-si (KR); Sung Mo Kim, Ansan-si (KR); Jong Hoon Oh, Gwangju (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 66 days.

(21) Appl. No.: 13/799,258

(22) Filed: Mar. 13, 2013

(65) Prior Publication Data

US 2013/0241385 A1    Sep. 19, 2013

(30) Foreign Application Priority Data

Mar. 16, 2012  (KR) .................. 10-2012-0027185

(51) Int. Cl.
| | | |
|---|---|---|
| *A47B 96/04* | (2006.01) | |
| *F25D 23/02* | (2006.01) | |
| *F25D 21/04* | (2006.01) | |
| *F25D 23/04* | (2006.01) | |
| *F25D 23/08* | (2006.01) | |

(52) U.S. Cl.
CPC .............. *F25D 23/028* (2013.01); *F25D 21/04* (2013.01); *F25D 23/02* (2013.01); *F25D 23/04* (2013.01); *F25D 23/087* (2013.01); *F25D 2323/021* (2013.01)

(58) Field of Classification Search
CPC ... E05Y 2900/31; F25D 23/028; F25D 23/08; F25D 23/085; F25D 23/087; F25D 2323/021
USPC .................................... 312/405, 324; 62/449
See application file for complete search history.

(56) References Cited

U.S. PATENT DOCUMENTS

| | | | | |
|---|---|---|---|---|
| 1,918,865 | A * | 7/1933  | Purdy ............................. 49/313 |
| 3,045,663 | A * | 7/1962  | McDonnold .................. 126/190 |
| 4,428,153 | A * | 1/1984  | Klinger et al. .................. 49/366 |
| 4,711,098 | A * | 12/1987 | Kuwabara et al. ............. 62/441 |
| 5,694,789 | A * | 12/1997 | Do .................................. 62/441 |

(Continued)

FOREIGN PATENT DOCUMENTS

| | | |
|---|---|---|
| JP | 2-122191 | 5/1990 |
| JP | 4-244579 | 9/1992 |

(Continued)

OTHER PUBLICATIONS

PCT Search Report issued Jun. 12, 2013 in corresponding International Application No. PCT/KR2013/002110.
Korean Office Action issued Dec. 19, 2014 in corresponding Korean Patent Application No. 10-2012-0027185.

*Primary Examiner* — Hanh V Tran
(74) *Attorney, Agent, or Firm* — Staas & Halsey LLP

(57) ABSTRACT

A refrigerator provided with a rotating bar configured to seal a gap between one pair of doors, capable of preventing the door from being incompletely closed due to an erroneous operation of the rotating bar, the rotating bar capable of sealing a gap formed between the rotating bar and a body as well as a gap formed between one pair of doors, the rotating bar being elastically supported by an elastic member so as to move by receiving an external force from a guide part provided on the body, the rotating bar including a sealing member protruding from the rotating bar so as to seal a gap between the rotating bar and the body.

15 Claims, 12 Drawing Sheets

(56) References Cited

U.S. PATENT DOCUMENTS

| | | |
|---|---|---|
| 7,008,032 B2 | 3/2006 | Chekal et al. |
| 2005/0046319 A1* | 3/2005 | Chekal et al. ............ 312/401 |
| 2007/0257589 A1* | 11/2007 | Laible ..................... 312/405 |
| 2008/0209812 A1* | 9/2008 | Lancry et al. ............ 49/316 |
| 2009/0273264 A1* | 11/2009 | Butler ..................... 312/405 |
| 2010/0071404 A1* | 3/2010 | Han et al. ............... 62/441 |

FOREIGN PATENT DOCUMENTS

| | | |
|---|---|---|
| JP | 2011-112290 | 6/2011 |
| KR | 10-2010-0035095 | 4/2010 |
| KR | 10-2011-0032898 | 3/2011 |
| KR | 10-2011-0072774 | 6/2011 |

* cited by examiner

REFRIGERATOR

CROSS-REFERENCE TO RELATED APPLICATIONS

This application claims the benefit of Korean Patent Application No. 10-2012-0027185, filed on Mar. 16, 2012, in the Korean Intellectual Property Office, the disclosure of which is incorporated herein by reference.

BACKGROUND

1. Field

Embodiments of the present disclosure relate to a refrigerator having a rotating bar configured to seal a gap formed between a pair of doors thereof.

2. Description of the Related Art

In general, a refrigerator is a household appliance having a storage compartment to store food, and a cool air supplying apparatus to supply cool air to the storage compartment to store the food in a fresh manner. The refrigerator, according to the storage compartment and a door thereof, may be classified into different types.

A TMF (Top Mounted Freezer)-type refrigerator is provided therein with a storage compartment that is divided into an upper side and a lower side by a horizontal partition while a freezing compartment is formed at the upper side and a refrigerating compartment is formed at the lower side, and a BMF (Bottom Mounted Freezer)-type refrigerator is provided with a refrigerating compartment formed at the upper side while a freezing compartment is formed at the lower side.

In addition, a SBS (Side By Side)-type refrigerator is provided therein with a storage compartment that is divided into an left side and a right side by a vertical partition while a freezing compartment is formed at one side and a refrigerating compartment is formed at the other side, and a FDR (French Door Refrigerator)-type refrigerator is provided therein with a storage compartment that is divided into an upper side and a lower side by a horizontal partition while a refrigerating compartment is formed at the upper side and a freezing compartment is formed at the lower side, as the refrigerating compartment at the upper side is open/closed by a pair of doors.

Meanwhile, a gasket is provided at a door of a refrigerator to seal a gap which is formed between the door and the body of the refrigerator when the door is closed. However, with respect to the FDR-type refrigerator, the refrigerating compartment at the upper side is open and closed by a pair of doors, but the refrigerating compartment is not provided therein with a vertical partition, and thus a gap formed between the pair of doors may not be sealed by the gasket. In order to seal the gap between the pair of doors, a rotating bar rotatably installed at one of the pair of the doors is suggested.

The rotating bar as such, when the pair of doors is closed, is being rotated in a horizontal state with respect to the pair of doors to seal the gap in between the pair of doors, and when one door provided with the rotating bar installed thereto is open, the rotating bar is being rotated to a vertical state with respect to the other door, so that the rotating bar is not being interfered at the other door, which is not provided with the rotating bar installed thereto.

Meanwhile, the rotating bar includes a heat insulation member configured to block cool air from being discharged from a storage compartment, a metal plate formed of metal so as to come into close contact with a gasket installed at a rear surface of the door, and a heat generating member configured to radiate heat to prevent the frost from being formed at the plate.

SUMMARY

Therefore, it is an aspect of the present disclosure to provide a structure of a rotating bar having an enhanced insulation performance.

It is another aspect of the present disclosure to provide a structure of a rotating bar enabling an insertion protrusion of the rotating bar to be inserted into a guide part regardless of the position of the rotating bar.

It is still another aspect of the present disclosure to provide a structure of a rotating bar capable of sealing a gap between the rotating bar and a body as well as a gap between one pair of doors.

Additional aspects of the disclosure will be set forth in part in the description which follows and, in part, will be apparent from the description, or may be learned by practice of the disclosure.

In accordance with one aspect of the present disclosure, a refrigerator includes a body, a storage compartment, a first door, a second door, a first gasket, a second gasket, a rotating bar and a guide part. The storage compartment may be formed at an inside of the body while having a front surface thereof open. The first door may be configured to open/close a portion of the front surface of the storage compartment that is open. The second door may be configured to open/close a remaining portion of the front surface of the storage compartment that is open. The first gasket may be installed at a rear surface of the first door to seal a gap formed between the first door and the body. The second gasket may be installed at a rear surface of the second door to seal a gap formed between the second door and the body. The rotating bar may be rotatably coupled to the first door to seal a gap formed between the first door and the second door in a state that the first door and the second door are closed. The guide part may be provided at the body to guide a rotation of the rotating bar, and may have a guide body part fixed to the body and a guide groove formed in the guide body part. The rotating bar may include a case, a heat insulation member, a metallic plate, a heat generating member, and an insertion protrusion. The case may be provided with an accommodating space therein. The heat insulation member may be accommodated in the accommodating space. The metallic plate may be coupled to the case. The heat generating member may be configured to prevent frost from being formed on the metallic plate. The insertion protrusion may be configured to be elastically biased toward an outer side of the case so as to be inserted into the guide groove, and upon exertion of external force, may be configured to move toward an inner side of the case.

If the first door is closed in a state of the rotating bar being rotated in perpendicular to the first door, the insertion protrusion may enter the guide groove through an entry of the guide groove and then may be rotated along a curved surface of the guide groove. If the first door is closed in a state of the rotating bar being rotated in parallel to the first door, the insertion protrusion may move toward the inner side of the case by the external force of the guide body part to avoid an interference with the guide body part, and then may move toward the outer side of the case by the elastic force so as to be inserted into the guide groove.

The insertion protrusion may include a protrusion part, an elastic member, and a stopper part. The protrusion part may be configured to be inserted into the guide groove. The elastic member may be configured to elastically support the protrusion part such that the protrusion part protrudes toward the outer side of the case. The stopper part may be configured to prevent the protrusion part from being separated to an outside the case.

The protrusion part may include an inclined surface. The inclined surface may be configured to allow the protrusion part to perform a vertical movement by a horizontal force exerted on the protrusion part.

The insertion protrusion may be provided on at least one of an upper end and a lower end of the rotating bar.

The case may be provided with a passage part provided in a form of a hole that allows the insertion protrusion to pass therethrough.

A support part configured to support the elastic member may be provided at the inner side of the case.

The rotating bar may further include a sealing member. The sealing member may have a blocking wall that protrudes to the outer side of the case so as to seal a gap formed between the body and the rotating bar.

The sealing member may be formed of rubber.

In accordance with another aspect of the present disclosure, a refrigerator includes a body, a storage compartment, a pair of doors, a rotating bar, and a sealing member. The storage compartment may be formed at an inside of the body while having a front surface thereof open. The pair of doors may be rotatably coupled to the body to open/close the front surface of the storage compartment that is open. The rotating bar may be rotatably coupled to one of the pair of doors to seal a gap formed between the pair of doors in a state that the pair of doors are closed. The sealing member may protrude from the rotating bar to seal a gap formed between the rotating bar and the body.

The refrigerator may further include a guide part and an insertion protrusion. The guide part may be provided at an upper side of the body to guide a rotation of the rotating bar. The insertion protrusion may protrude toward an upper side from the rotating bar so as to be rotated while being inserted into the guide part. The insertion protrusion may be provided so as to enable a vertical movement.

The refrigerator may further include an elastic member. The elastic member may be configured to elastically support the insertion protrusion to the upper side.

The insertion protrusion may include an inclined surface that allows the insertion protrusion to move to a lower side by a pressing force exerted in a horizontal direction.

As described above, with respect to the rotating bar for sealing a gap between one pair of doors, the doors are prevented from being incompletely closed due to an erroneous operation of the rotating bar, and the convenience of use is improved.

In addition, the rotating bar seals a gap between the rotating bar and the door as well as a gap between one pair of doors, thereby improving the heat insulation efficiency of the storage compartment.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
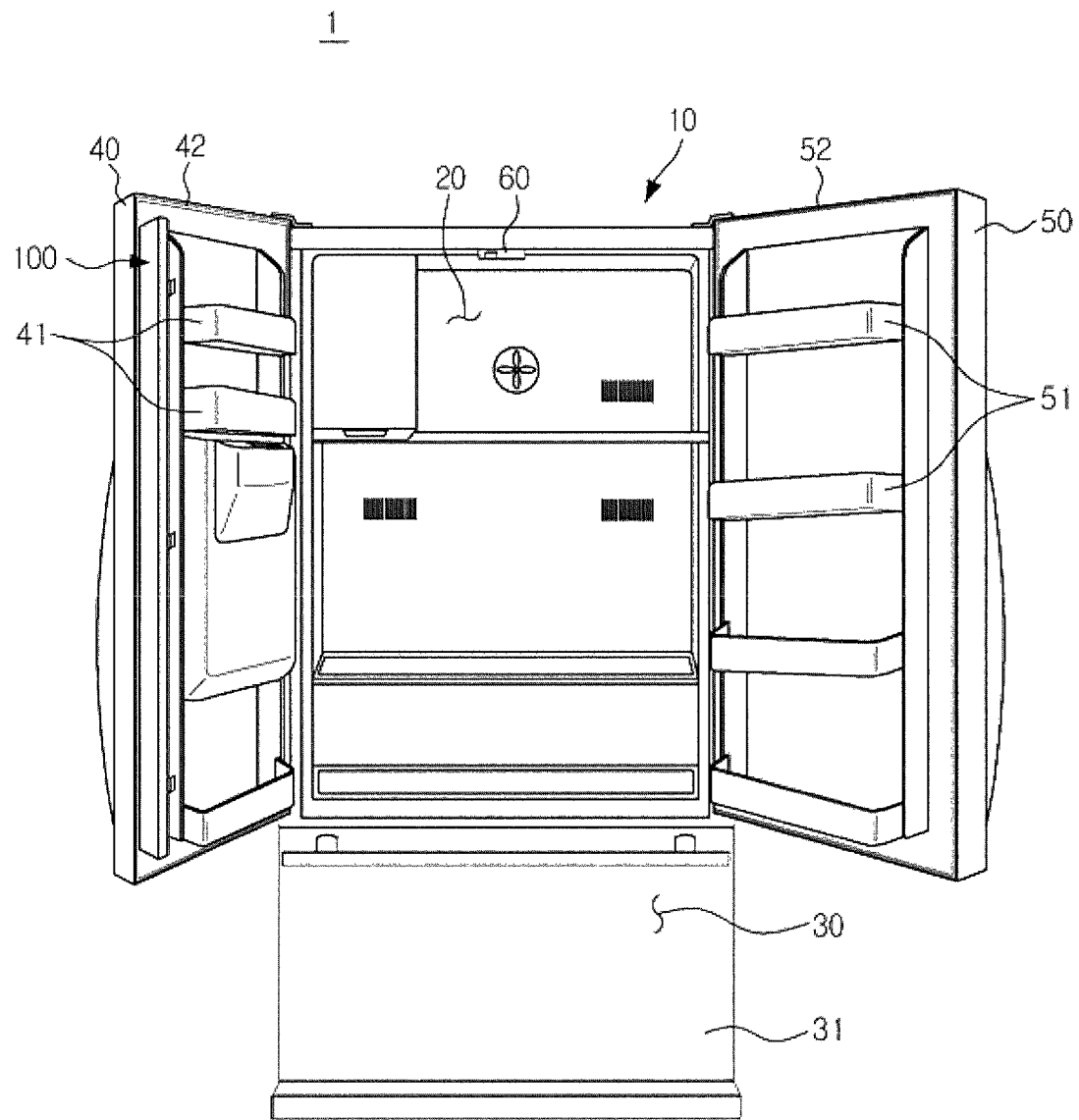
FIG. 1 is a drawing illustrating a front of a refrigerator in accordance with one aspect of the present disclosure.

Reference will now be made in detail to the embodiments of the present disclosure, examples of which are illustrated in the accompanying drawings, wherein like reference numerals refer to like elements throughout.

FIG. 1 is a drawing illustrating a front of a refrigerator in accordance with one aspect of the present disclosure. Referring to FIG. 1, a refrigerator 1 in accordance with one embodiment of the present disclosure includes a body 10, storage compartments 20 and 30 divided into an upper side and a lower side at an inside the body 10, doors 31, 40, and 50 configured to open/close the storage compartments 20 and 30, and a cool air supplying apparatus (not shown) to supply cool air to the storage compartments 20 and 30.

The body 10 may include an inner case forming the storage compartments 20 and 30, an outer case forming an exterior appearance by being coupled to an outer side of the inner case, and a heat insulation member foamed in between the inner case and the outer case and configured to thermally insulate the storage compartments 20 and 30 from each other.

The cool air supplying apparatus (not shown) may generate cool air by using a cooling circulation cycle configured to compress, condense, expand, and evaporate refrigerant.

The storage compartments 20 and 30 may be provided with a front surface thereof open, and may be partitioned into the refrigerating compartment 20 at the upper side and the freezing compartment 30 at the lower side. The refrigerating compartment 20 may be open and closed by a pair of doors 40 and 50 that are rotatably coupled to the body 10, and the freezing compartment 30 may be open and closed by a sliding door 31 slidably mounted at the body 10.

The pair of doors 40 and 50 configured to open and close the refrigerating compartment 20 may be disposed side by side. Hereinafter, for the sake of convenience, the left side door 40 on the drawing is referred to as the first door 40 and the right side door 50 on the drawing is referred to as the second door 50.

The first door 40 is configured to open and close a left portion of the front surface of the refrigerating compartment 20 that is open, and the second door 50 is configured to open and close the remaining portion of the front surface of the refrigerating compartment 20 that is open. Door shelves 41 and 51 are provided at the rear surfaces of the first door 40 and the second door 50, respectively, to store foods. In addition, at the rims of the rear surfaces of the first door 40 and the second door 50, gaskets 42 and 52 are provided, respectively, to seal the gap with respect to the body 10 in a state that the first door 40 and the second door 50 are closed.

The gaskets 42 and 52 may be installed in a shape of a loop along the rims of the rear surfaces of the first door 40 and the second door 50, respectively, and magnets (42a and 52a in FIGS. 4 and 5) may be included at an inside the gaskets 42 and 52, respectively.

Meanwhile, in a state that the first door 40 and the second door 50 are closed, a gap may be formed between the first door 40 and the second door 50, and in order to seal the gap as such, a rotating bar 100 is rotatably mounted at the first door 40.

The rotating bar 100 as such is provided in a bar shape formed lengthwise along the height direction of the first door 40, and may be rotated by a guide part 60 provided at the body 10. The guide part 60 of the body 10 may include a guide body (61 in FIG. 6) coupled to the body 10, and a guide groove (62 in FIG. 6) formed at the guide body 61. Hereinafter, the structure and the operation of the rotating bar 100 as such will be described.

Figure 2:
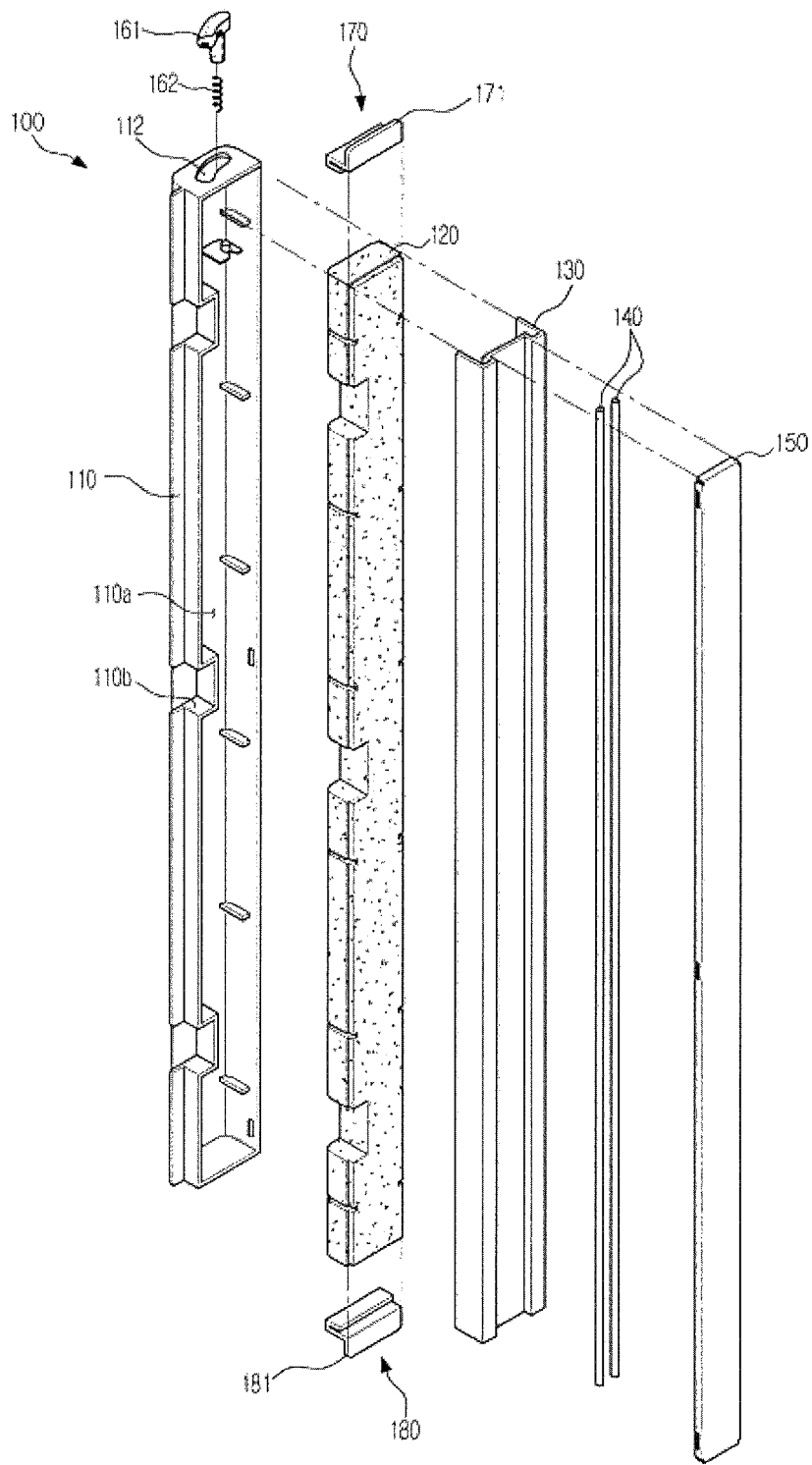
FIG. 2 is an exploded perspective view showing a structure of a rotating bar of the refrigerator of FIG. 1.
Figure 3:
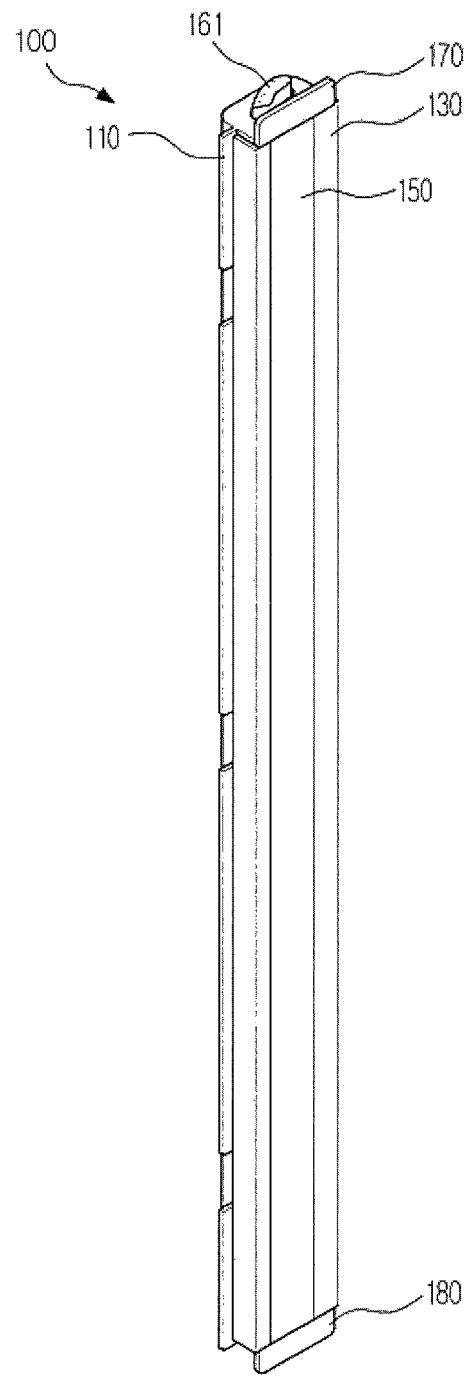
FIG. 3 is an assembled perspective view of the rotating bar of the refrigerator of FIG. 1.
Figure 4:
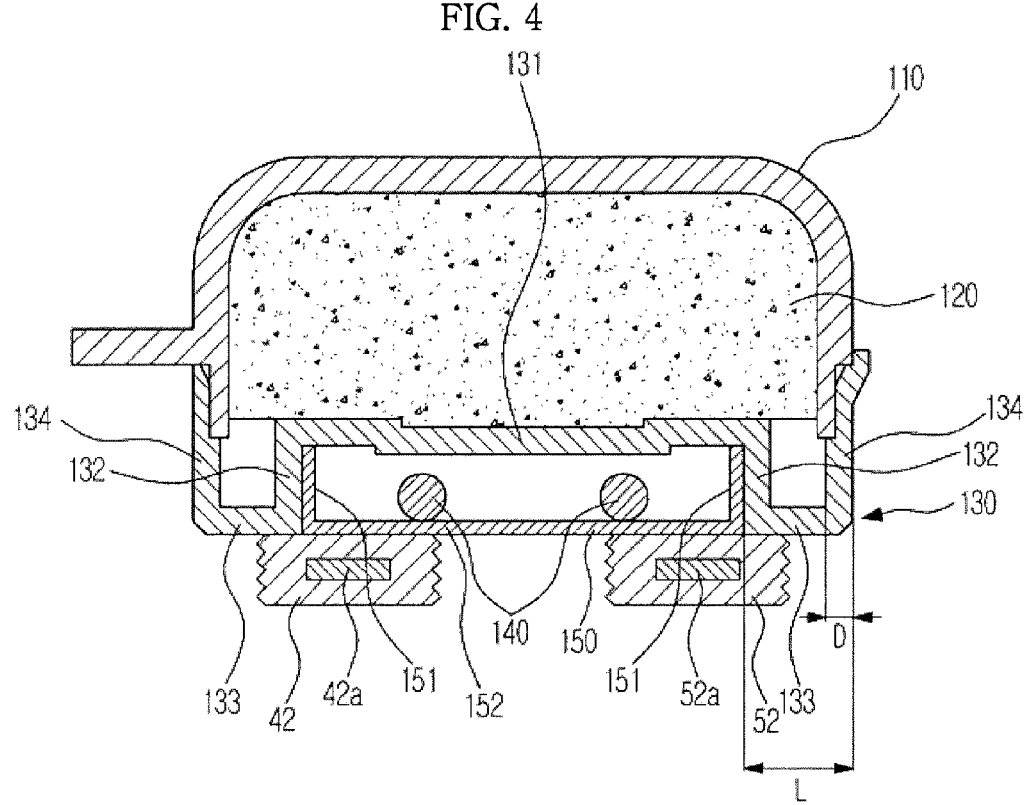
FIG. 4 is a cross-sectional view of the rotating bar of the refrigerator of FIG. 1.

FIG. 2 is an exploded perspective view showing a structure of the rotating bar of the refrigerator of FIG. 1, FIG. 3 is an assembled perspective view of the rotating bar of the refrigerator of FIG. 1, and FIG. 4 is a cross-sectional view of the rotating bar of the refrigerator of FIG. 1.

Referring to FIGS. 2 to 4, the rotating bar 100 includes a case 110 having an accommodating space 110*a* and provided with one surface thereof open, a heat insulation member 120 accommodated in the accommodating space 110*a* of the case 110, a cover 130 coupled to the one open surface of the case 110, a metallic plate 150 coupled to an outer side of the cover 130, and a heat generating member 140 disposed at a space in between the cover 130 and the metallic plate 150.

The case 110 is configured to form an external appearance of the rotating bar 100, and may be provided at an inside thereof with the accommodating space 110*a* having one surface open, and the one open surface of the rotating bar 100 may be covered by the cover 130. A hinge bracket coupling part 110*b* to which a hinge bracket (70 in FIG. 6) is coupled may be provided at the case 110.

Figure 6:
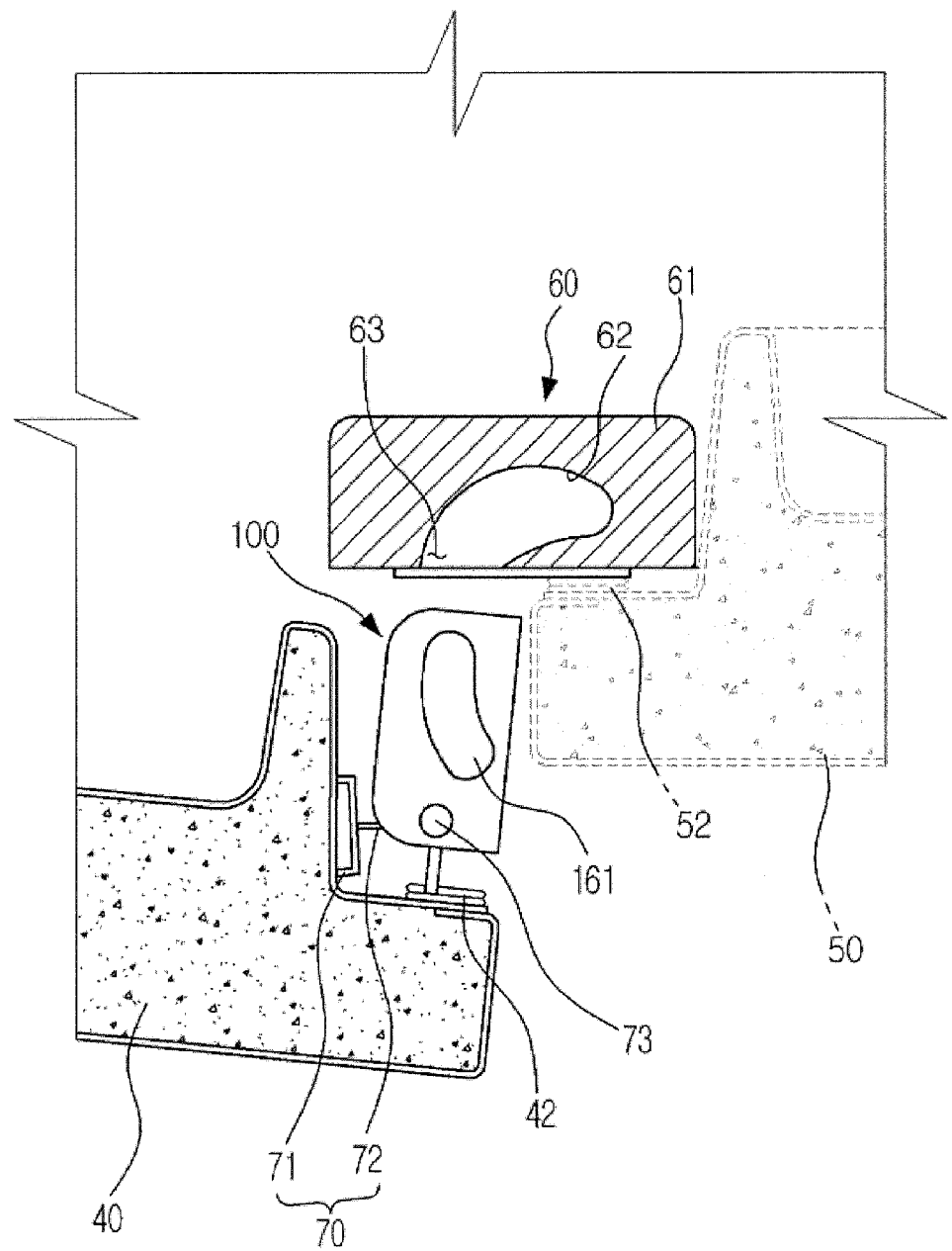
FIGS. 6 to 9 are drawings to describe the operation of the rotating bar of the refrigerator of FIG. 1.

The hinge bracket 70 may include a fixing part (71 in FIG. 6) fixed to the rear surface of the first door 40, and a hinge bar (72 in FIG. 6) configured to connect the fixing part 71 to the rotating bar 100, so that the rotating bar 100 is rotated on a rotation shaft (73 in FIG. 6). The fixing part 71 may be coupled to the rear surface of the first door 40 by use of a connecting member such as a screw.

In addition, at an upper surface of the case 110, a passage part 112 may be provided, so that an insertion protrusion 161 being inserted into the guide groove (62 in FIG. 6) of the guide part (60 in FIG. 6) may be protruded to an outside the case 110. The passage part 112 may be provided in the form of a hole having the same shape as the insertion protrusion 161.

In the embodiment of the present disclosure, the guide part 60 is formed at an upper portion of the body 10 while the insertion protrusion 161 is protruded toward an upper side of the rotating bar 100. However, the guide part 60 may be formed at a lower portion of the body 10 while the insertion protrusion 161 may be protruded toward a lower side of the rotating bar 100. In this case, the passage part 112 of the case 110 may also be formed at a lower surface of the case 110. The case 110 as such may be injection-molded using plastic material as an integrated body.

The heat insulation member 120 is configured to thermally insulate the refrigerating compartment 20, and may be formed of EPS (Expanded PolyStyrene) material having superior insulation performance and light weight. The heat insulation member 120, after being formed in an approximate shape to be inserted into the accommodating space 110*a* of the case 110, may be inserted into the accommodating space 110*a* of the case 110.

The cover 130 is configured to cover the one surface of the case 110 that is open, and may be coupled to the one open surface of the case 110 after the heat insulation member 120 is inserted into the accommodating space 110*a* of the case 110.

As illustrated on FIG. 4, the cover 130 is provided with a cross section obtained by being bent several times, and forms a portion of the side surface and a portion of the rear surface of the rotating bar 100. Here, the rear surface of the rotating bar 100 is referred to as a surface facing the gaskets 42 and 52 of the doors 41 and 51.

In detail, the cover 130 includes a heat insulation member adhering part 131 making contact with the heat insulation member 120, a second coupling part 132 to which the metallic plate 150, which will be described later, is coupled, a heat conduction blocking part 133 protruded toward the metallic plate 150, and a side surface forming part 134 forming at least one portion of the side surface of the rotating bar 100. The cover 130 may be injection molded using plastic material having low heat conductivity as an integrated body.

The metallic plate 150 may be coupled to an outer side of the cover 130 as such, and the metallic plate 150 is formed of metallic material so as to come into close contact with the gaskets 42 and 52 by the magnetic force of the magnets 42*a* and 52*a* included in the gaskets 42 and 52, and to provide rigidity to the rotating bar 100.

The metallic plate 150 may include a first coupling part 151 being coupled to the second coupling part 132 of the cover 130, and a gasket close-contact part 152 coming into close contact with the gaskets 42 and 52. The first coupling part 151 of the metallic plate 150 is coupled to the second coupling part 132 of the cover 130 by a connecting member such as a screw or by an adhesive member.

Meanwhile, the heat generating member 140, which is configured to generate heat to prevent frost from being formed on the metallic plate 150 due to the temperature difference between the inside and the outside the refrigerating compartment 40, may be disposed at a space formed by the first coupling part 151 of the metallic plate 150 and the gasket close-contact part 152 of the metallic plate 150.

Here, so as to prevent the heat generated from the heat generating member 140 from being excessively delivered to the metallic plate 150, the heat generating member 140 may be implemented by a heating cable 140, which includes a heating wire covered with non-conductive material such as silicon or an FEP (Fluorinated Ethylene Propylene).

Thus, the heat generating member 140, so as to deliver the minimum amount of heat to the metallic plate 150 to prevent frost from being formed on the metallic plate 150, may be disposed in a line-contacted manner with the metallic plate 150 instead of being surface-contacted with the metallic plate 150.

Meanwhile, the heat conduction blocking part 133 of the cover 130 and the gasket close-contact part 152 of the metallic plate 150, both of which were previously described, form the rear surface of the rotating bar 100. The central portion of the rear surface of the rotating bar 100 is formed by the gasket close-contact part 152 of the metallic plate 150, and both side edge portions of the rear surface of the rotating bar 100 are formed by the heat conduction blocking part 133 of the cover 130.

In order to prevent the heat, which is being conducted along the gasket close-contact part 152 of the metallic plate 150, from being conducted to the side surface of the rotating bar 100, the heat conduction blocking part 133 of the cover 130 is needed to be provided for a predetermined length L.

The length L of the heat conduction blocking part 133 of the cover 130 is provided to be approximately larger than a thickness D of the cover 130, and within the limit that the metallic plate 150 comes into close contact with the gaskets 42 and 52 by the magnetic force of the magnets 42a and 52a that are included in the gaskets 42 and 52, the length of the gasket close-contact part 152 of the metallic plate 150 may be reduced while increasing the length L of the heat conduction blocking part 133 of the cover 130.

According to the structure as the above, in a state where the first door 40 and the second door 50 are closed, the rotating bar 100 may seal the gap between the first door 40 and the second door 50 while coming into close contact with the gaskets 42 and 52 of the first door 40 and the second door 50, and may also minimize the heat, which is generated from the heat generating member 140 of the rotating bar 100, from penetrating to an inside the refrigerating compartment 20.

Thus, the insulation performance of the rotating bar 100 is enhanced while the heat loss of the heat generating member 140 is minimized, thereby able to save the energy needed to prevent frost from being formed on the rotating bar 100.

Meanwhile, sealing members (170 and 180 in FIG. 2) may be provided at an upper end and at a lower end of the rotating bar 100, respectively, to seal a gap formed between the rotating bar 100 and the body 10 in a state that the doors 40 and 50 are closed.

The sealing member 170 of the upper end and the sealing member 180 of the lower end may include blocking walls 171 and 181, respectively, which protrude to seal the gap in between the guide part 60 of the body 10 and the rotating bar 100 in a state that the door 40 is closed.

Figure 12:
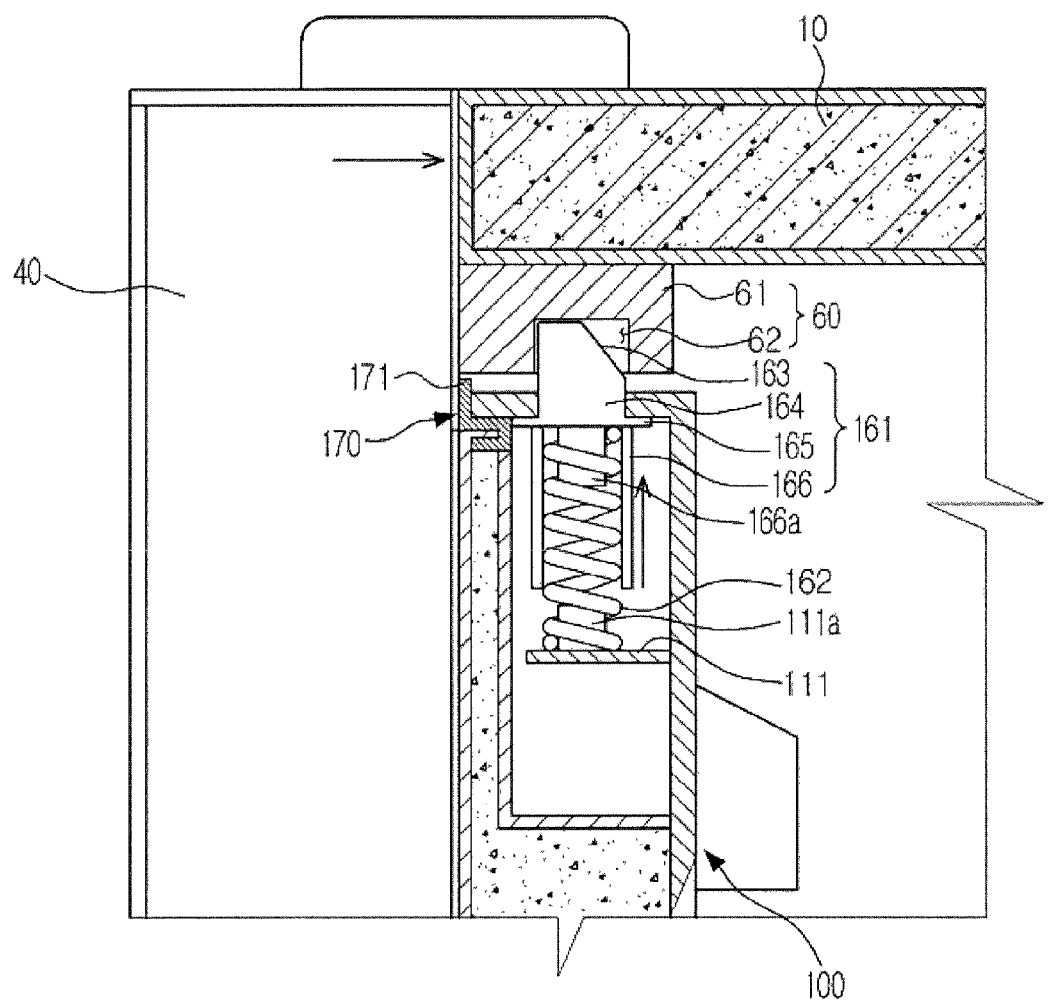

As illustrated in one embodiment shown in FIG. 12 of the present disclosure, in a case when the guide part 60 is provided at an upper portion of the body 10, the sealing member 170 may seal the gap between the guide part 60 and the rotating bar 100.

The sealing members 170 and 180 as such may be formed of flexible material such as rubber to seal the gap between the body 10 and the rotating bar 100 in a smooth manner without damage by a collision.

Figure 5:
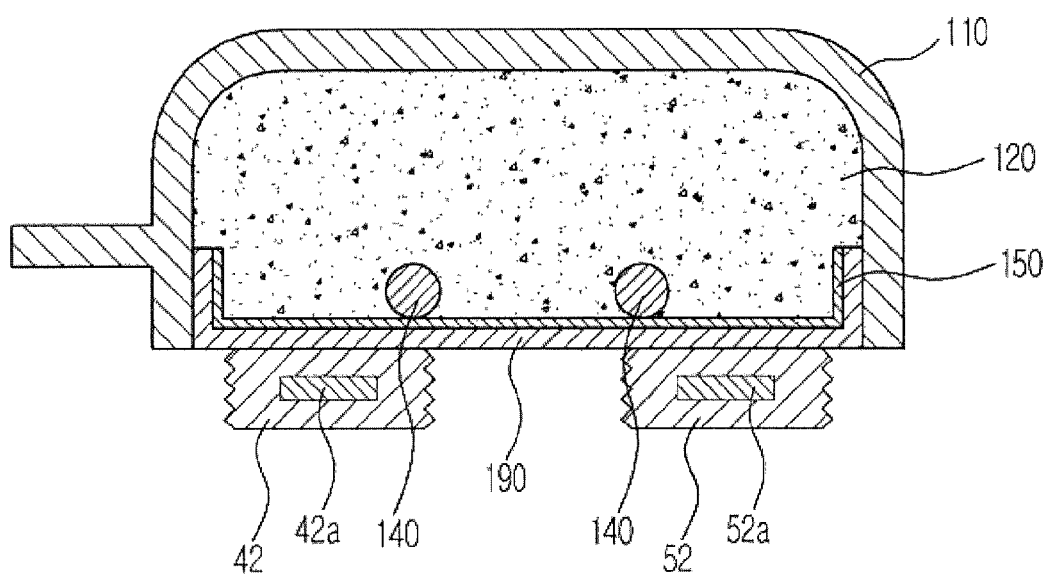
FIG. 5 is a cross-sectional view of a rotating bar of a refrigerator in accordance with another aspect of the present disclosure.

FIG. 5 is a cross-sectional view of a rotating bar of a refrigerator in accordance with another aspect of the present disclosure. Hereinafter, the structure of a rotating bar in accordance with another embodiment of the present disclosure will be described with reference to FIG. 5. In the following description, the same reference numerals will be assigned to the parts of the present embodiment that are identical to those according to the previous embodiment, and details of parts will be omitted in order to avoid redundancy.

In accordance with another embodiment of the present disclosure, the rotating bar 100 includes a case 110 provided with an accommodating space formed at an inside thereof and having one surface thereof open, a heat insulation member 120 accommodated in the accommodating space of the case 110, a metallic plate 150 coupled to the one open surface of the case 110, a heat generating member 140 configured to radiate heat to prevent frost from being formed on the metallic plate 150, and a heat insulation film 190 formed on a surface of the metallic plate 150 that is exposed to the outside.

The heat insulation film 190 is configured to increase the heat resistance of the metallic plate 150 so as to prevent the heat generated at the heat generating member 140 from penetrating to the refrigerating compartment 20 after being delivered along the metallic plate 150 to the both side surfaces of the rotating bar, and the heat insulation film 190 may be formed of material having a low heat conductivity.

The heat insulation film 190 may be formed on the surface of the metallic plate 150 through a method such as a coating, or may be formed by attaching processed material having a shape of a thin panel to the metallic plate 150.

However, the heat insulation film 190 is needed to be provided with a thickness less than a predetermined thickness, so that, in a state of the first door 40 and the second door 50 are closed, the rotating bar may come into close contact with the gaskets 42 and 52 by the magnetic force of the magnets 42a and 52a that are included in the gaskets 42 and 52.

As for the heat generating member 140, a heating cable may be used, and by being line-contacted with the metallic plate 150, may supply the minimum amount of heat needed to prevent frost from being formed at the metallic plate 150. The heat generating member 140, except for the area that is being line-contacted with the metallic plate 150, is disposed in a way to be surrounded by the heat insulation member 120, thereby minimizing heat loss.

FIGS. 6 to 9 are drawings to describe the operation of the rotating bar of the refrigerator of FIG. 1. Referring to FIGS. 6 to 9, the operation of the rotating bar of the refrigerator in accordance with one embodiment of the present disclosure will be described in brief.

Figure 7:
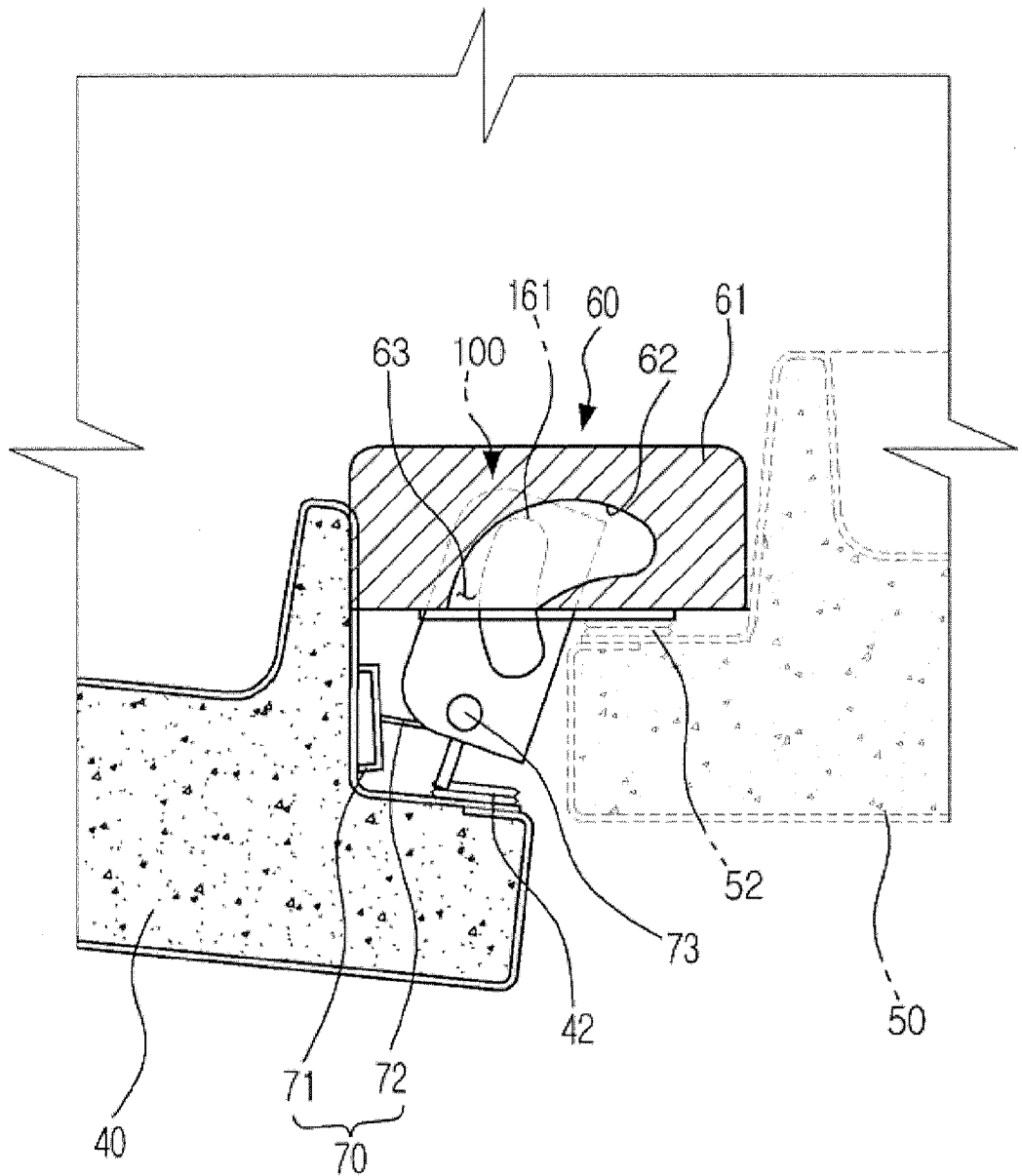
Figure 8:
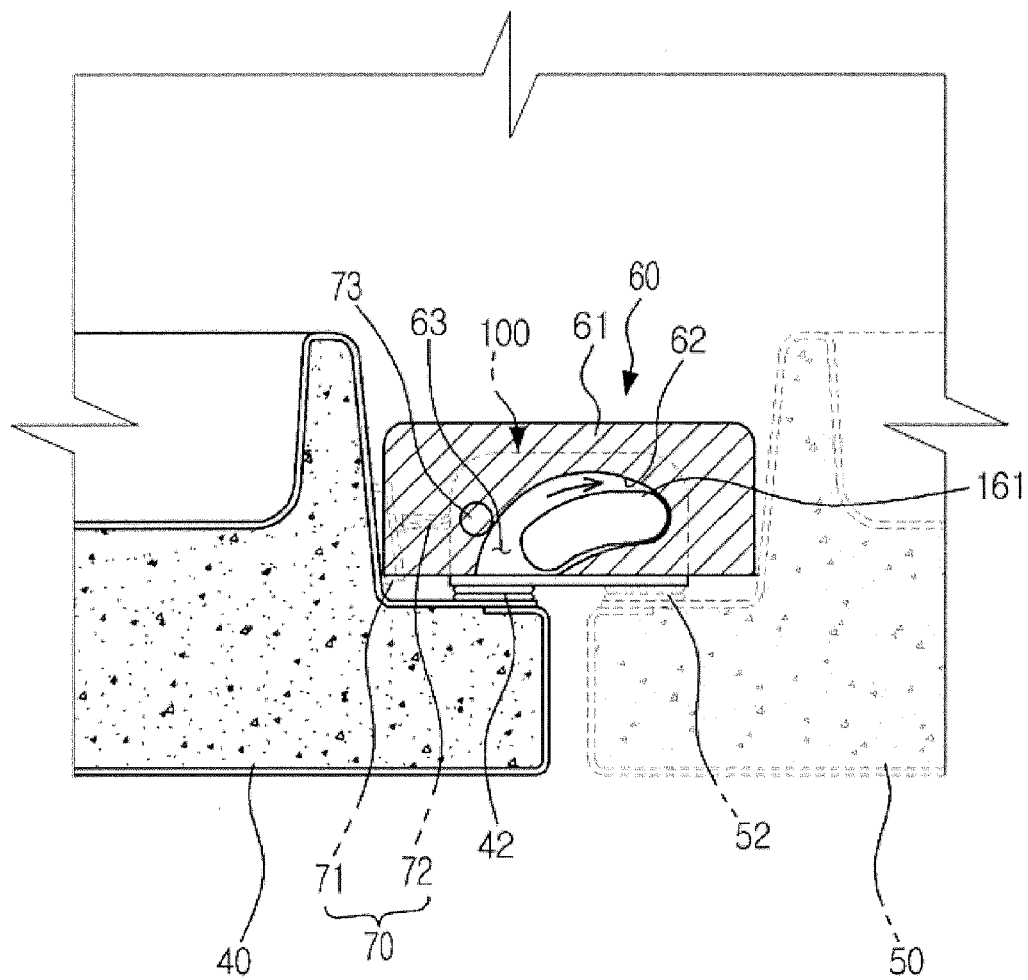

FIG. 6 illustrates a normal position of the rotating bar 100 in a state that the door 40 is open, FIG. 7 illustrates a process of the first door 40 being closed from the state of FIG. 6, and FIG. 8 illustrates a state of the first door 40 and the second door 50 closed.

Figure 9:
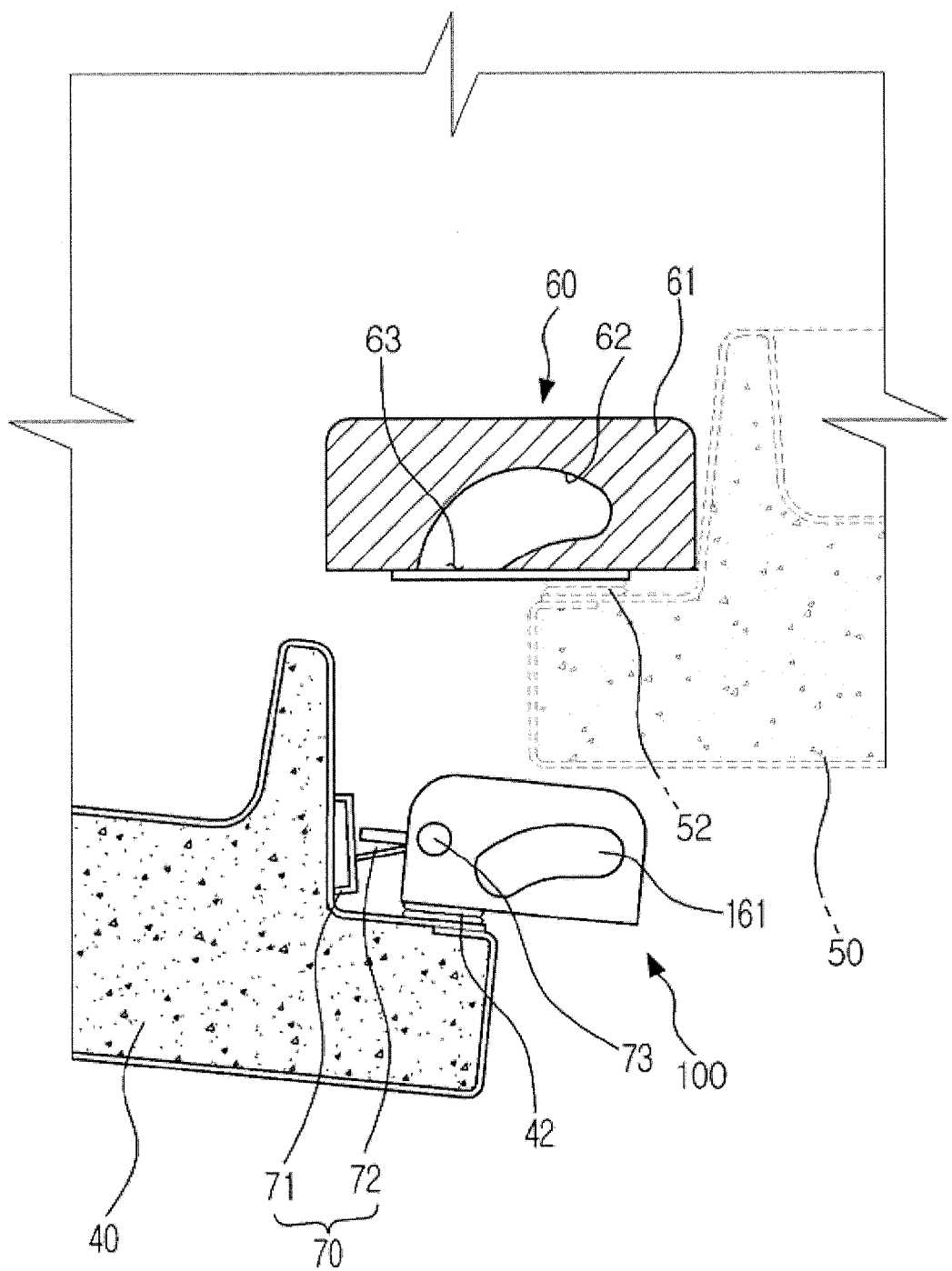

FIG. 9 illustrates an abnormal position of the rotating bar 100 in a state that the first door 40 is open.

As illustrated on FIG. 6, in a state that the first door 40 is open, the normal position of the rotating bar 100 is a position at which the rear surface of the rotating bar 100 is approximately perpendicular to the longitudinal direction of the first door 40. Hereinafter, the position as such is referred to as a vertical position.

In a state that the rotating bar 100 is at the vertical position, as the first door 40 is closed, as illustrated on FIG. 7, the insertion protrusion 161 of the rotating bar 100 may enter an inside the guide groove 62 through a guide groove entry 63 of the guide part 60 that is provided at the body 10.

The insertion protrusion 161 that enters an inside the guide groove 62 is rotated along the curved surface of the guide groove 62, and as the insertion protrusion 161 rotates, the rotating bar 100 is also rotated.

Finally, as illustrated on FIG. 8, when the first door 40 is completely closed, the rear surface of rotating bar 100 is disposed in an approximately horizontal to the longitudinal direction of the first door 40 and of the second door 50, and thus the rotating bar 100 comes into close contact with the gaskets 42 and 52, thereby able to seal the gap in between the first door 40 and the second door 50. Hereinafter, the position of the rotating bar 100 as such will be referred to as a horizontal position.

Finally, in the process of the first door 40 being closed, the rotating bar 100, in the order of sequence as illustrated on FIG. 6, FIG. 7, and FIG. 8, is rotated in clockwise direction on the drawings.

In addition, on the contrary, in the process of the first door 40 being open, the rotating bar 100, in the order of sequence of FIG. 8, FIG. 7, and FIG. 6, is rotated in the counterclockwise direction with respect to the drawings, and in the state of the first door 40 is completely open, the rotating bar 100 is disposed at the vertical position.

As the above, as the rotating bar 100 is disposed at the vertical position, the first door 40, even in a state of the second door 50 being closed, may be closed without having the rotating bar 100 being interfered by the second door 50, and in addition, the insertion protrusion 161 of the rotating bar 100 may enter the guide groove 62 through the guide groove entry 63.

However, in a state that the first door 40 is open, the rotating bar 100 may be disposed at the horizontal position due to an erroneous operation by a user. In this case, in the process of the first door 40 being closed, the rotating bar 100 may be interfered by the second door 50. In addition, even if the rotating bar 100 does not interfere with the second door 50 since the second door 50 is open, the insertion protrusion 161 may not be able to enter the guide groove 62 through the guide groove entry part 63, and may collide with the guide body 61.

Thus, the first door 40 is not being completed closed, and the cool air of the refrigerating compartment 20 may be discharged, thereby causing a damage on the insertion protrusion 161.

Thus, the insertion protrusion 161 of the rotating bar 100 of the refrigerator in accordance with one embodiment of the present disclosure is configured to be vertically movable, so that the insertion protrusion 161 is inserted into the guide groove 62 without being collided with the guide body 61 even in a state of the rotating bar 100 being at the horizontal position. The structure of the insertion protrusion 161 as such will be described hereinafter.

Figure 10:
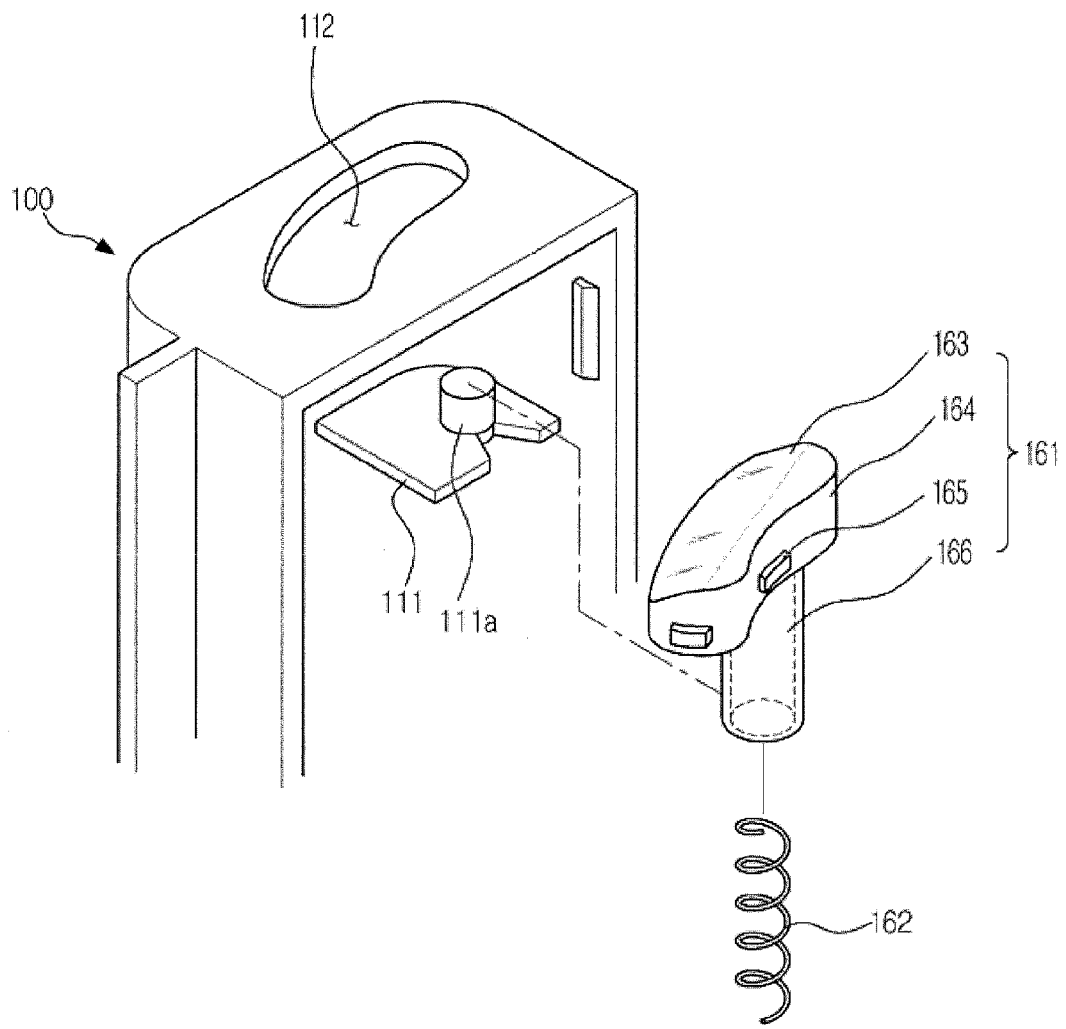
FIG. 10 is a drawing showing a structure of an insertion protrusion of the rotating bar of the refrigerator of FIG. 1.
Figure 11:
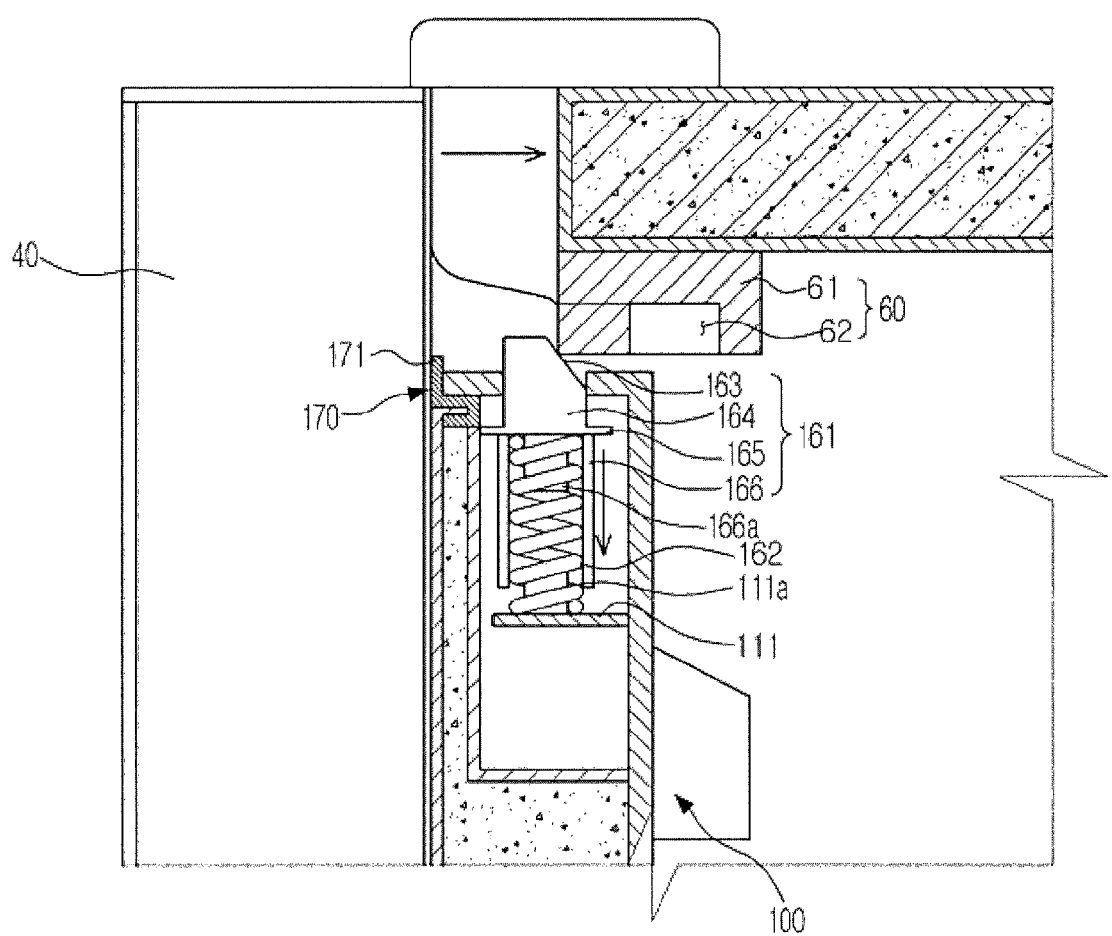
FIGS. 11 to 12 are drawings to describe a vertical movement of the insertion protrusion of the rotating bar of the refrigerator of FIG. 1.

FIG. 10 is a drawing showing a structure of the insertion protrusion of the rotating bar of the refrigerator of FIG. 1, and FIGS. 11 to 12 are drawings to describe a vertical movement of the insertion protrusion of the rotating bar of the refrigerator of FIG. 1.

Referring to FIGS. 10 to 12, the insertion protrusion 161 includes a body part 166 disposed at an inside the rotating bar 100, a protrusion part 164 protruded to the outside the rotating bar 100 through the passage part 112 of the rotating bar 100, a stopper part 165 to prevent the insertion protrusion 161 from being separated to the outside the rotating bar 100, and an inclined surface 163 formed at the protrusion part 164.

The body part 166 is provided at an inside thereof with a hollowness into which an elastic member 162 may be inserted, and the insertion protrusion 161 is elastically biased by the elastic member 162 in a state of that the protrusion part 164 protrudes to the outside the rotating bar 100.

At the case 110 of the rotating bar 100, a supporting part 111 to support the elastic member 162 is provided, and also a supporting bar 111a is protruded from the supporting part 111. At the body part 166, a supporting bar 166a is provided to support the elastic member 162.

The protrusion part 164 is provided with an approximately same shape as the passage part 112 while provided with a size smaller than the size of the passage part 112 so as to be able to pass through the passage part 112. The protrusion part 164 may be provided with the stopper part 165 to limit the protrusion range of the protrusion part 164 to the outside of the protrusion part 164.

The inclined surface 163 formed at the protrusion part 164 is configured to convert horizontal force into vertical force, and is configured in a way that the insertion protrusion 161 may move vertically by the horizontal pressing force of the guide body 61 in the process of the first door 40 being closed while the rotating bar 100 is at the horizontal position.

Thus, as illustrated on FIG. 9, if the first door 40 is closed in a state of the rotating bar 100 is at the horizontal position, the insertion protrusion 161 is collided with the guide body 61, and may descend by the pressing force of the guide body 61.

In the state as such, when the first door 40 is completely closed, the insertion protrusion 161 is ascended by the restoration force of the elastic member 162, and may be inserted into the guide groove 62.

According to the structure as the above, the first door 40 of the refrigerator in accordance with one embodiment of the present disclosure, even in a state that the rotating bar 100 is rotated to the horizontal position, may be closed without interference. Thus, the user convenience is enhanced, and the cool air loss due to the incomplete closing of the doors 40 and 50 may be prevented.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A refrigerator, comprising:
a body;
a storage compartment having an opening;
a first door configured to open/close a portion of the opening;
a second door configured to open/close a remaining portion of the opening;
a first gasket installed at a rear surface of the first door;
a second gasket installed at a rear surface of the second door to seal a gap formed between the second door and the body;
a rotating bar rotatably coupled to the first door to seal a gap formed between the first door and the second door in a state that the first door and the second door are closed; and
a guide part provided within the storage compartment, and configured to guide rotation of the rotating bar,
wherein the rotating bar comprises
a case provided with an accommodating space therein;
a heat insulation member accommodated in the accommodating space;
a cover coupled to cover the accommodating space, a portion of the heat insulation member being supported by the cover, and the cover having at least one heat conduction blocking part, at least one side surface forming part and at least one second coupling part at at least one of left and right sides thereof, the heat conduction blocking part, the side surface forming part and the second coupling part extending substantially an entire length of the rotating bar and forming an empty space, the length of the heat conduction blocking part being larger than a thickness of the cover;
a metallic plate positioned between the heat conduction blocking parts;
a heat generating member configured to be attached to a rear surface of the metallic plate; and
an insertion protrusion with an inclined surface, the insertion protrusion being configured to be downwardly movable when the inclined surface is collided with the guide part.

2. The refrigerator of claim 1, wherein the heat generating member is line-contacted with the metallic plate.

3. The refrigerator of claim 1, wherein the rotating bar further comprises sealing members disposed to extend above vertical end portions of the case, the sealing members to cover gaps formed at the vertical end portions of the rotating bar when the first door is closed.

4. The refrigerator of claim 1, wherein the insertion protrusion comprises:
  a protrusion part configured to be inserted into the guide groove;
  an elastic member configured to elastically support the protrusion part such that the protrusion part protrudes toward the outer side of the case; and
  a stopper part configured to prevent the protrusion part from being separated from an outside of the case.

5. The refrigerator of claim 1, wherein the cover further includes a heat insulation member adhering part making contact with the heat insulation member,
  wherein the metallic plate is coupled to the second coupling part to which the metallic plate is coupled,
  wherein the side surface forming part forms at least one portion of the side surface of the rotating bar, and
  wherein the heat conduction blocking part is disposed between the second coupling part and the side surface forming part.

6. The refrigerator of claim 5, wherein the metallic plate comprises:
  a first coupling part coupled to the second coupling part of the cover, and
  a gasket close-contact part coming into close contact with the first gasket and the second gasket,
  wherein the heat conduction blocking part and the gasket close-contact part form a same flat surface.

7. A refrigerator, comprising:
  a body;
  a storage compartment having an opening;
  a first door configured to open/close a portion of the opening;
  a second door configured to open/close a remaining portion of opening;
  a first gasket installed at a rear surface of the first door;
  a second gasket installed at a rear surface of the second door to seal a gap formed between the second door and the body;
  a rotating bar coupled to the first door to seal a gap formed between the first door and the second door in a state that the first door and the second door are closed;
  a guide part provided within the storage compartment, and configured to guide rotation of the rotating bar
  wherein the rotating bar comprises
    a case provided with an accommodating space therein;
    a heat insulation member accommodated in the accommodating space;
    a cover coupled to cover the accommodating space, a portion of the heat insulation member being supported by the cover, and the cover having at least one heat conduction blocking parts, at least one side surface forming part and at least one second coupling part, at at least one of left and right sides thereof, the heat conduction blocking part, the side surface forming part and the second coupling part extending substantially an entire length of the rotating bar and forming an empty space, the length of the heat conduction blocking part being larger than a thickness of the cover;
    a metallic plate positioned between the heat conduction blocking parts; and
    a heat generating member configured to be attached to a rear surface of the metallic plate.

8. The refrigerator of claim 7, wherein the cover includes a heat insulation member adhering part making contact with the heat insulation member,
  wherein the metallic plate is coupled to the second coupling part,
  wherein the side surface forming part forms at least one portion of the side surface of the rotating bar, and
  wherein the heat conduction blocking part is disposed between the second coupling part and the side surface forming part.

9. The refrigerator of claim 7, wherein the heat generating member is line-contacted with the metallic plate.

10. A refrigerator, comprising:
  a body;
  a storage compartment having a opening;
  a first door configured to open/close a portion of the opening;
  a second door configured to open/close a remaining portion of opening;
  a first gasket installed at a rear surface of the first door;
  a second gasket installed at a rear surface of the second door to seal a gap formed between the second door and the body;
  a rotating bar coupled to the first door to seal a gap formed between the first door and the second door in a state that the first door and the second door are closed; and
  a guide part provided within the storage compartment, and configured to guide rotation of the rotating bar,
  wherein the rotating bar comprises
    a case provided with an accommodating space therein, and having one surface thereof open;
    a heat insulation member accommodated in the accommodating space;
    a cover to cover the accommodating space, and provided with a cross section obtained by being bent a number of times to form an empty space at at least one of left and right sides thereof, the empty space extending substantially a length of the rotating bar, a width of the empty space being larger than a thickness of the cover;
    a metallic plate positioned between the cross section of the cover; and
    a heat generating member configured to be attached to a rear surface of the metallic plate.

11. The refrigerator of claim 10, wherein the cover includes a heat insulation member adhering part making contact with the heat insulation member, a second coupling part to which the metallic plate is coupled, a heat conduction blocking part protruded toward the metallic plate, and a side surface forming part forming at least one portion of the side surface of the rotating bar, and
  wherein the empty space is formed by the second coupling part, the heat conduction blocking part and the side surface forming part.

12. The refrigerator of claim 11, wherein the metallic plate comprises a first coupling part being coupled to the second coupling part of the cover, and a gasket close-contact part coming into close contact with the first gasket and the second gasket,
  wherein the heat conduction blocking part and the gasket close-contact part form a same flat surface.

13. The refrigerator of claim 10, wherein the heat generating member is line-contacted with the metallic plate.

14. The refrigerator of claim 10, wherein the cover includes a protrusion portion protruding towards the heat generating member.

15. The refrigerator of claim 14, wherein the protrusion portion contacts the heat generating member.

* * * * *